US008679696B2

(12) United States Patent
Bogumil et al.

(10) Patent No.: US 8,679,696 B2
(45) Date of Patent: Mar. 25, 2014

(54) PEM FUEL CELL STACK HYDROGEN DISTRIBUTION INSERT

(75) Inventors: Todd D. Bogumil, Rochester, NY (US);
Steven G. Goebel, Victor, NY (US);
Gary M. Robb, Honeoye Falls, NY (US); Clipson M. Class, Avon, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 12/725,697

(22) Filed: Mar. 17, 2010

(65) Prior Publication Data

US 2011/0229799 A1    Sep. 22, 2011

(51) Int. Cl.
*H01M 2/38* (2006.01)

(52) U.S. Cl.
USPC ........... 429/459; 429/456; 429/458; 429/512; 429/513

(58) Field of Classification Search
USPC .................. 429/512–516, 410, 456, 458, 459
See application file for complete search history.

(56) References Cited

U.S. PATENT DOCUMENTS

| 4,233,146 | A | * | 11/1980 | Rothmayer et al. | 204/255 |
| 4,463,067 | A | * | 7/1984 | Feigenbaum | 429/451 |
| 5,514,486 | A | * | 5/1996 | Wilson | 429/457 |
| 5,958,613 | A | * | 9/1999 | Hamada et al. | 429/410 |
| 6,924,056 | B2 | | 8/2005 | Whiton et al. | |
| 7,393,605 | B2 | * | 7/2008 | Blanchet et al. | 429/434 |
| 7,416,580 | B2 | * | 8/2008 | Nyman et al. | 95/90 |
| 7,648,792 | B2 | * | 1/2010 | Kaschmitter et al. | 429/424 |
| 7,771,889 | B2 | * | 8/2010 | Cho et al. | 429/513 |
| 7,875,397 | B2 | * | 1/2011 | Geschwindt et al. | 429/415 |
| 8,110,319 | B2 | * | 2/2012 | Nguyen et al. | 429/514 |
| 8,216,461 | B2 | * | 7/2012 | Tabb et al. | 210/198.1 |
| 2003/0211371 | A1 | * | 11/2003 | Pan | 429/13 |
| 2005/0118487 | A1 | | 6/2005 | Whiton et al. | |
| 2005/0129999 | A1 | * | 6/2005 | Geschwindt et al. | 429/22 |
| 2006/0280995 | A1 | * | 12/2006 | Whiton et al. | 429/38 |
| 2007/0243431 | A1 | * | 10/2007 | Zhu et al. | 429/19 |
| 2008/0085437 | A1 | * | 4/2008 | Dean et al. | 429/26 |
| 2009/0123808 | A1 | * | 5/2009 | An et al. | 429/34 |
| 2010/0062289 | A1 | * | 3/2010 | Christie et al. | 429/13 |

FOREIGN PATENT DOCUMENTS

DE          69602805 T2     4/2000
DE     112004002349 T5    11/2006

* cited by examiner

*Primary Examiner* — Basia Ridley
*Assistant Examiner* — James Erwin
(74) *Attorney, Agent, or Firm* — Fraser Clemens Martin & Miller LLC; J. Douglas Miller

(57) ABSTRACT

A fluid distribution insert adapted to be received within an inlet header of a fuel cell assembly is disclosed. The fluid distribution insert includes a hollow insert with a first end and a second end. An inlet is formed at the first end of the hollow insert in fluid communication with a source of a reactant gas and adapted to receive the reactant gas therein. A plurality of outlets is formed intermediate the first end and the second end. A plurality of flow channels is formed in the hollow insert providing fluid communication between the inlet and the outlets to deliver the fluid to a plurality of fuel cells of the fuel cell assembly, wherein a total flow volume and flow resistance of each of the flow channels is substantially the same to provide for a substantially simultaneous delivery of the reactant gas to the fuel cells.

17 Claims, 6 Drawing Sheets

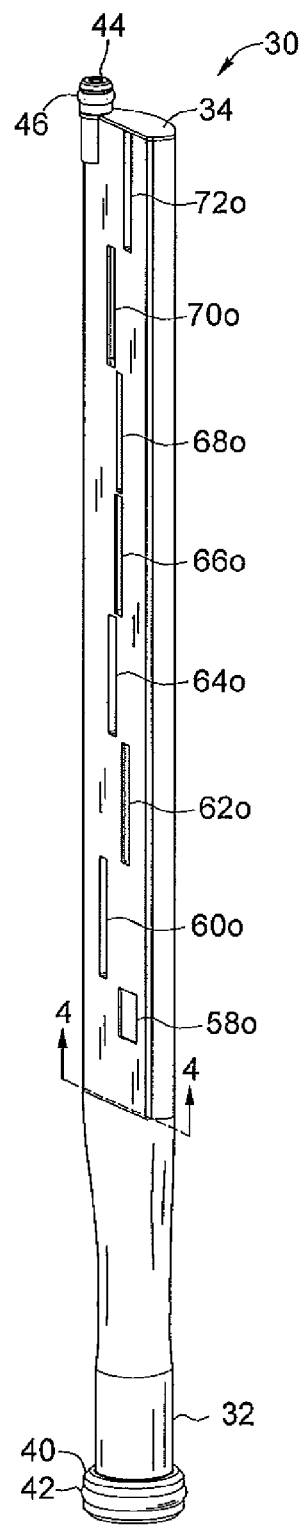
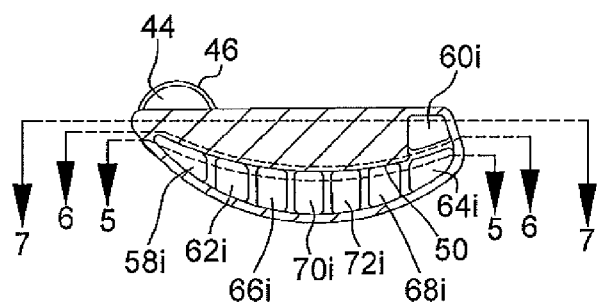
FIG. 3
FIG. 4

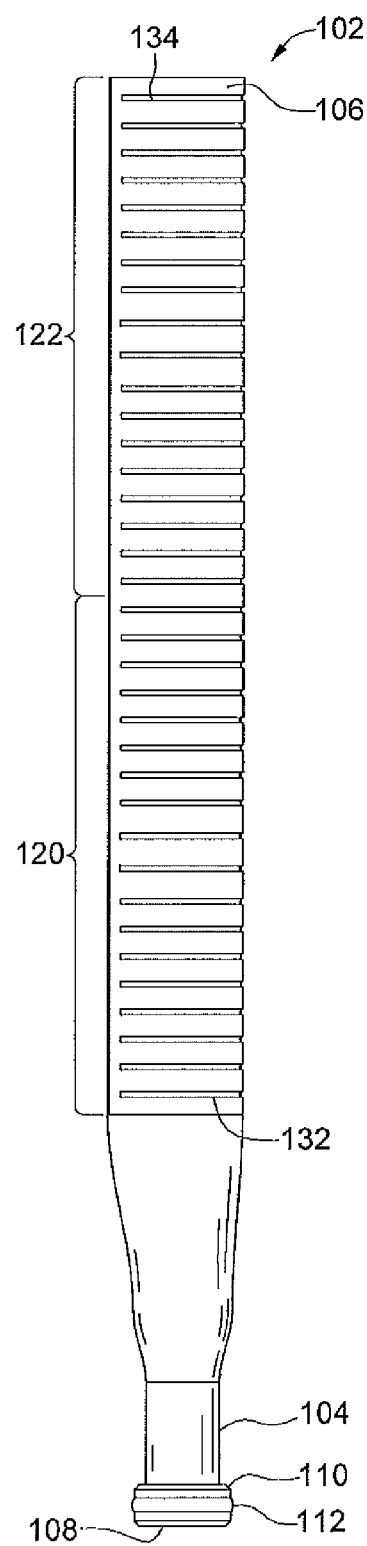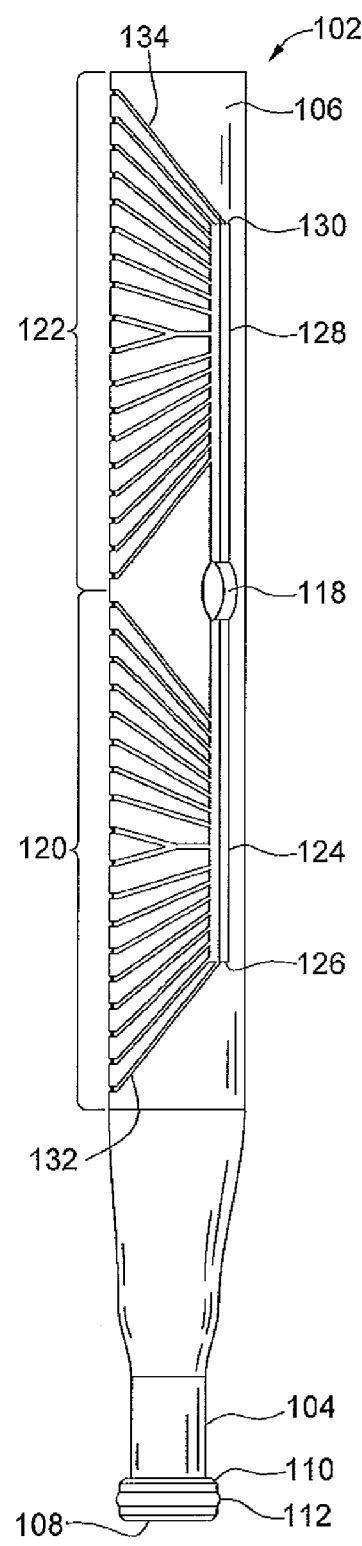

PEM FUEL CELL STACK HYDROGEN DISTRIBUTION INSERT

FIELD OF THE INVENTION

The present disclosure relates to a fuel cell stack and more particularly to a fuel cell stack including an insert disposed in an inlet header thereof to facilitate a uniform flow of fluid to fuel cells of the fuel cell stack.

BACKGROUND OF THE INVENTION

Fuel cell power systems convert a fuel and an oxidant (reactants) to electricity. One type of fuel cell power system employs a proton exchange membrane (PEM) to catalytically facilitate reaction of the fuel (such as hydrogen) and the oxidant (such as air or oxygen) to generate electricity. Water is a byproduct of the electrochemical reaction. The PEM is a solid polymer electrolyte that facilitates transfer of protons from an anode electrode to a cathode electrode in each individual fuel cell of a stack of fuel cells normally deployed in a fuel cell power system.

In the typical fuel cell assembly, the individual fuel cells have fuel cell plates with channels, through which various reactants and cooling fluids flow. Fuel cell plates may be unipolar or bipolar, for example. A bipolar plate may be formed by combining unipolar plates. The oxidant is supplied to the cathode electrode from a cathode inlet header and the fuel is supplied to the anode electrode from an anode inlet header. Movement of the water byproduct from the channels to an outlet header is typically caused by the flow of the reactants through the fuel cell assembly. Boundary layer shear forces and a pressure of the reactant aid in transporting the water through the channels until the water exits the fuel cell through the outlet header.

A membrane-electrode-assembly (MEA) is disposed between successive plates to facilitate the electrochemical reaction. The MEA includes the anode electrode, the cathode electrode, and an electrolyte membrane disposed therebetween. Porous diffusion media (DM) are positioned on both sides of the MEA to facilitate a delivery of reactants for the electrochemical fuel cell reaction.

When initiating the electrochemical fuel cell reaction in the fuel cell stack, it is typically desirable to provide the hydrogen fuel in such a manner to cause the individual fuel cells to receive the hydrogen in the active areas thereof at substantially the same time. However, the inlet header typically fills with hydrogen in such a manner that causes fuel cells closest to a hydrogen inlet of the inlet header to be the first fuel cells to receive the hydrogen. Conversely, the fuel cells that are farthest from the hydrogen inlet of the inlet header are the last fuel cells to receive the hydrogen.

As the hydrogen flows into the active areas of the fuel cell plates, a localized voltage rise may be measured. When an electrical load is applied to the fuel cell stack, the voltage rise generates a current that is driven through the remaining fuel cell plates of the fuel cell stack. Fuel cells of the fuel cell stack which do not have a sufficient amount of hydrogen to support the current may experience a localized reversed current, thereby resulting in electrode carbon corrosion. Delaying the start of the electrochemical fuel cell reaction until such time as all the fuel cells are supplied with hydrogen typically results in an undesired emission of hydrogen through the exhaust header of the fuel cell stack.

Various techniques have been employed to simultaneously provide hydrogen to each of the fuel cells at the start-up of the electrochemical fuel cell reaction in the fuel cell stack. One such technique includes providing an inlet header purge valve such as disclosed in U.S. Patent Application Publication No. 2005/0129999. The purge valve enables the inlet header to be flushed with hydrogen just prior to initiating the electrochemical fuel cell reaction. The purge valve increases a cost of the fuel cell stack and introduces additional moving parts to the system.

An alternative technique has employed a plurality of fluid passages to form an external header that supplies the hydrogen to distributed locations within the inlet header of the fuel cell stack. U.S. Pat. No. 6,924,056 and U.S. Patent Application Publication Nos. 2005/0118487 and 2006/0280995 generally illustrate such a technique. The external header may be difficult to seal against the fuel cell stack, and increases a cost and overall size of the fuel cell stack.

It would be desirable to produce a cost effective inlet header insert for a fuel cell stack that facilitates a substantially simultaneous delivery of a hydrogen fuel to each fuel cell in the fuel cell stack at the initiation of an electrochemical fuel cell reaction.

SUMMARY OF THE INVENTION

Compatible and attuned with the present invention, a cost effective inlet header insert for a fuel cell stack that facilitates a substantially simultaneous delivery of a hydrogen fuel to each fuel cell in the fuel cell stack at the initiation of an electrochemical fuel cell reaction, has been surprisingly discovered.

In one embodiment, a hollow insert with a first end and a second end, the hollow insert received within an inlet header of a fuel cell assembly; an inlet formed at the first end of the hollow insert adapted to receive a fluid therein; a plurality of outlets formed intermediate the first end and the second end; and a plurality of flow channels formed in the hollow insert providing fluid communication between the inlet and the outlets to deliver the fluid to a plurality of fuel cells of the fuel cell assembly, wherein the flow channels provide for a substantially simultaneous delivery of the fluid to the fuel cells.

In another embodiment, a fluid distribution insert for a fuel cell assembly comprises a hollow insert with a first end and a second end, the hollow insert received within an inlet header of a fuel cell assembly; an inlet formed at the first end of the hollow insert adapted to receive a fluid therein; a first coupling member formed adjacent the first end of the hollow insert to facilitate coupling the inlet of the hollow insert to a fluid supply conduit; a second coupling member formed adjacent the second end of the hollow insert to facilitate coupling the hollow insert to the fuel cell assembly; a plurality of outlets formed intermediate the first end and the second end; and a plurality of flow channels formed in the hollow insert providing fluid communication between the inlet and the outlets to deliver the fluid to a plurality of fuel cells of the fuel cell assembly, wherein the flow channels provide for a substantially simultaneous delivery of the fluid to the fuel cells.

In another embodiment, a fuel cell assembly comprises a hollow insert with a first end and a second end, the hollow insert received within an inlet header of a fuel cell assembly; an inlet formed at the first end of the hollow insert adapted to receive a fluid therein; a first coupling member formed adjacent the first end of the hollow insert to facilitate coupling the inlet of the hollow insert to a fluid supply conduit; a second coupling member formed adjacent the second end of the hollow insert to facilitate coupling the hollow insert to the fuel cell assembly; a plurality of outlets formed intermediate the first end and the second end; and a plurality of flow channels formed in the hollow insert providing fluid communication between the inlet and the outlets to deliver the fluid to a plurality of fuel cells of the fuel cell assembly, wherein the flow channels provide for a substantially simultaneous delivery of the fluid to the fuel cells.

DRAWINGS

The above, as well as other advantages of the present invention will become readily apparent to those skilled in the art from the following detailed description, particularly when considered in the light of the drawings described hereafter.

FIG. 3 is an enlarged front perspective view of the distribution insert illustrated in FIG. 1;

FIG. 4 is an enlarged bottom cross-sectional view of the distribution insert illustrated in FIG. 1 taken along line 4-4 of FIG. 3;

FIG. 9 is an front elevational view of an inner tube of the distribution insert illustrated in FIG. 8;

FIG. 10 is a rear elevational view of the inner tube of the distribution insert illustrated in FIG. 8;

DETAILED DESCRIPTION OF THE INVENTION

Figure 2:
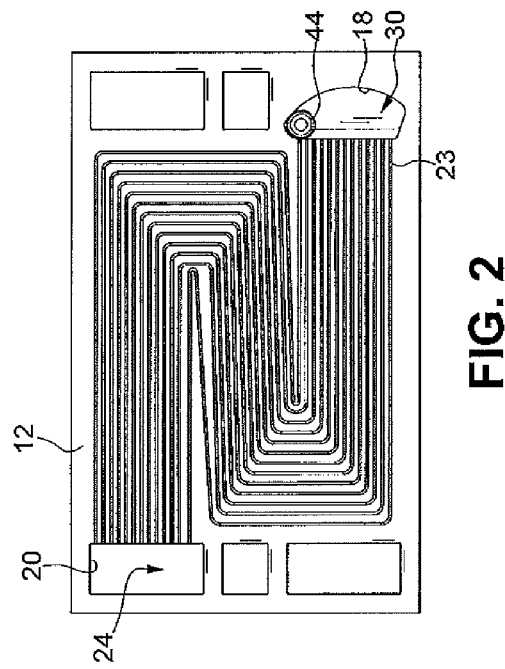
FIG. 2 is a top plan view of the fuel cell stack illustrated in FIG. 1 with an end plate removed.

The following description is merely exemplary in nature and is not intended to limit the present disclosure, application, or uses. It should also be understood that throughout the drawings, corresponding reference numerals indicate like or corresponding parts and features.

Figure 1:
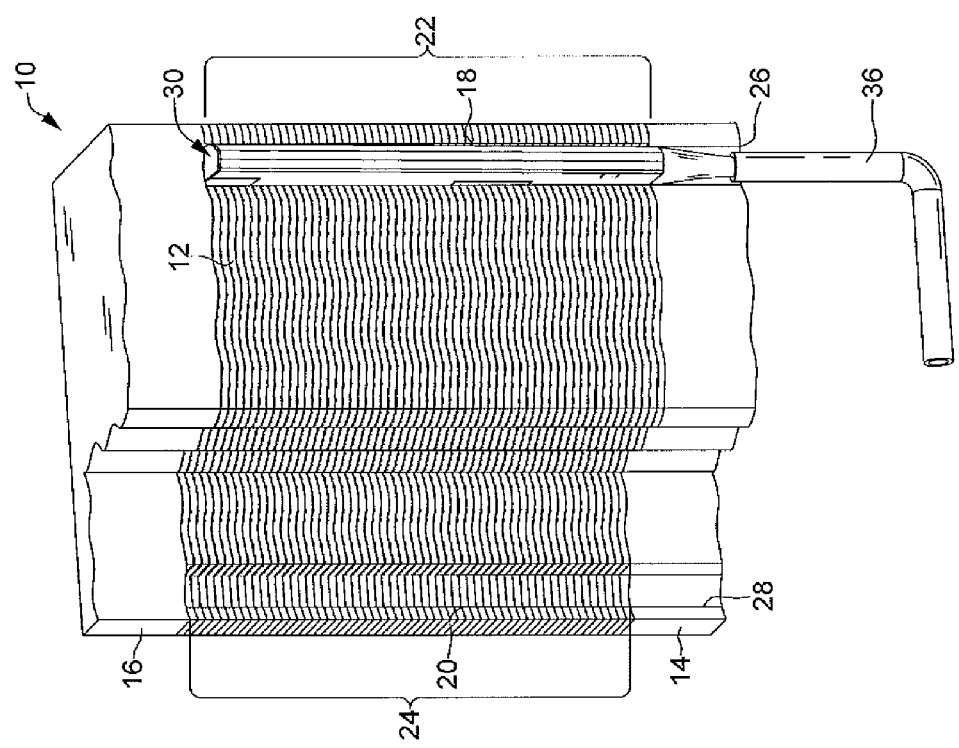
FIG. 1 is a fragmentary perspective view of a fuel cell stack according to an embodiment of the invention showing a distribution insert disposed within an inlet header of the fuel cell.
Figure 5:
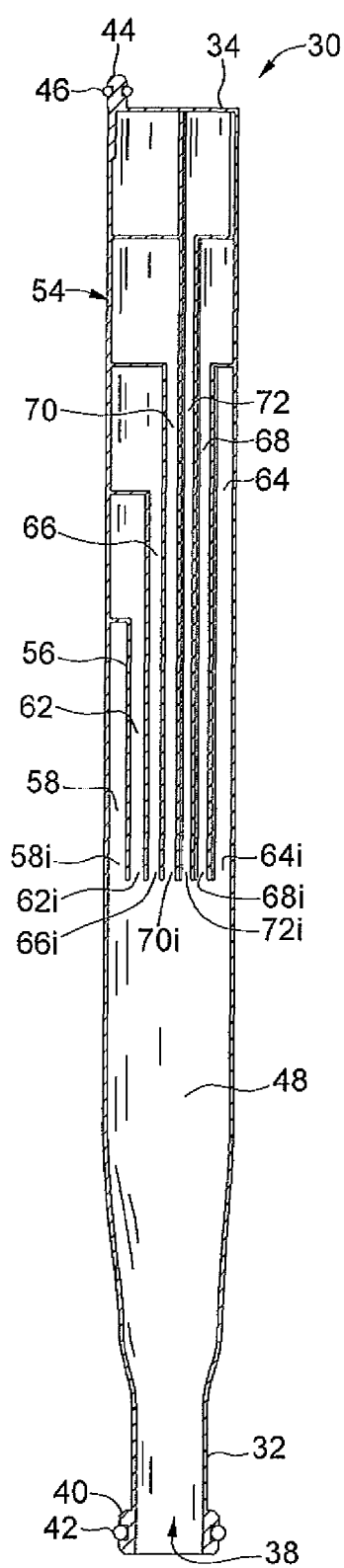
FIG. 5 is an enlarged cross-sectional elevational view of the distribution insert illustrated in FIG. 1 taken along line 5-5 of FIG. 4 showing a rear section thereof.
Figure 6:
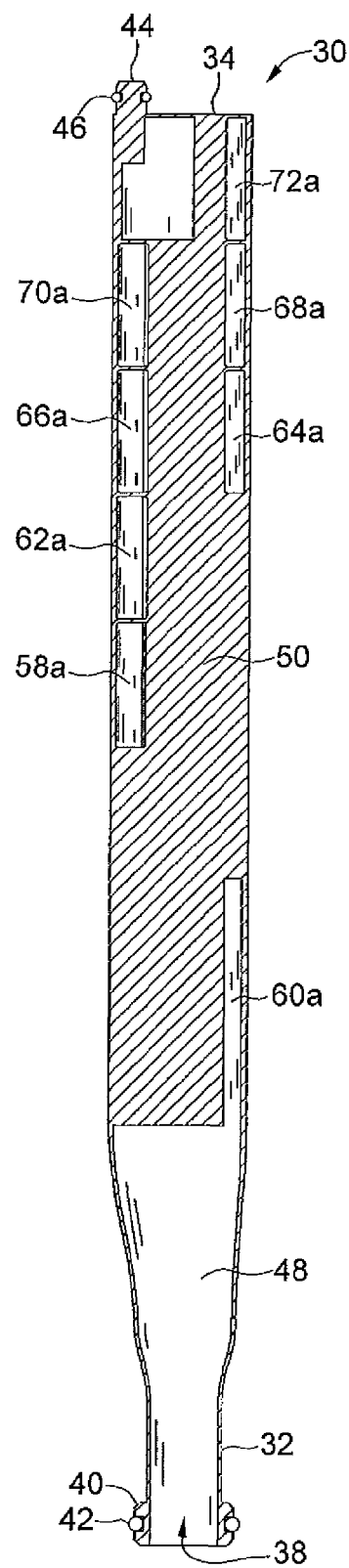
FIG. 6 is an enlarged cross-sectional elevational view of the distribution insert illustrated in FIG. 1 taken along line 6-6 of FIG. 4 showing a dividing wall thereof.
Figure 7:
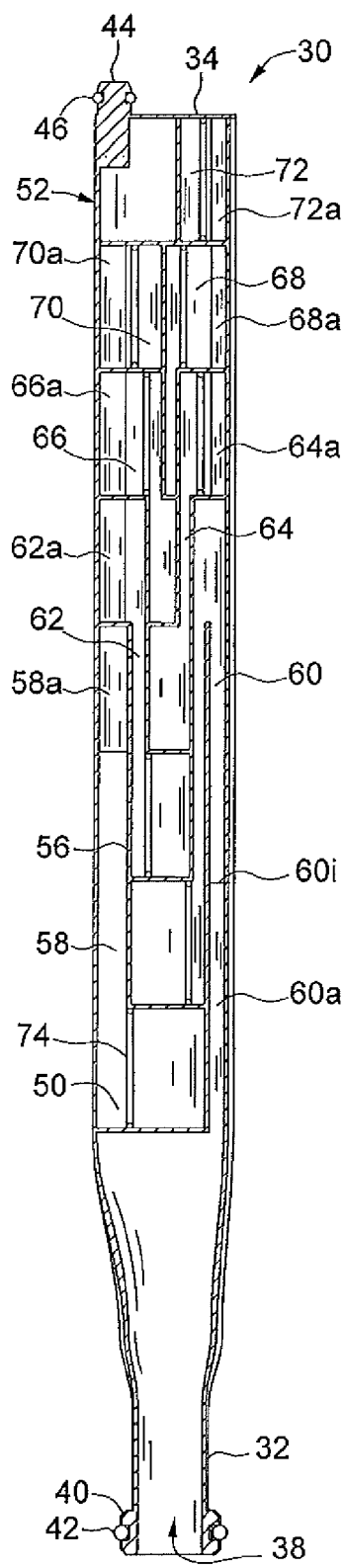
FIG. 7 is an enlarged cross-sectional elevational view of the distribution insert illustrated in FIG. 1 taken along line 7-7 of FIG. 4 showing a front section thereof.

FIGS. 1-2 show a fuel cell assembly 10 according to an embodiment of the present disclosure. The fuel cell assembly 10 includes a plurality of stacked fuel cells 12 disposed between end plates 14, 16. Each of the fuel cells 12 includes an inlet port 18 and an outlet port 20. The fuel cells 12 are stacked with the inlet port 18 and the outlet port 20 of each fuel cell 12 substantially aligned with the respective inlet port 18 and the outlet port 20 of an adjacent fuel cell 12. Collectively, the inlet ports 18 of each of the fuel cells 12 form an inlet header 22 and the outlet ports 20 of each of the fuel cells 12 form an outlet header 24. The inlet header 22 is adapted to provide a flow of a reactant such as a fuel (e.g. hydrogen) from a source of a fuel (not shown) or an oxidant (e.g. air or oxygen) from a source of an oxidant (not shown), for example, to a plurality of inlet channels 23 of the fuel cells 12. In the illustrated embodiment, the inlet header 22 is an anode inlet header providing a flow of a fuel to the fuel cells 12.

The end plate 14 includes an inlet 26 formed therein in fluid communication with the inlet header 22, and an outlet 28 formed therein in fluid communication with the outlet header 24. The inlet 26 and the outlet 28 are substantially aligned with the respective inlet header 22 and the outlet header 24. The end plate 16 may include a fluid passage formed therethrough in fluid communication with the inlet header 22. It should be understood that a pressure relief valve, purge valve, and the like, for example, can be provided in the fluid passage to selectively allow a flow of a fluid therethrough.

A fluid distribution insert 30, more clearly shown in FIGS. 3-7, is disposed within the inlet header 22. As shown, the distribution insert 30 is a generally hollow elongate insert having a first end 32 and a second end 34, wherein the first end 32 is disposed adjacent the inlet 26 of the end plate 14 and the second end 34 is disposed adjacent the end plate 16. A supply conduit 36 provides fluid communication from the source of the fuel to an inlet 38 at the first end 32 of the distribution insert 30. The distribution insert 30 is adapted to provide a fluid flow path from the supply conduit 36 to the inlet header 22.

A first coupling member 40 is formed adjacent the first end 32 of the distribution insert 30 adapted to facilitate coupling the distribution insert 30 to the supply conduit 36. A first sealing member 42 such as an O-ring, for example, can be provided to facilitate forming a substantially fluid tight seal between the first coupling member 40 and the supply conduit 36. It should be understood that other first coupling members such as a threaded coupling, a snap-fit coupling, a sliding radial seal, and the like, for example, can be provided to facilitate coupling the distribution insert 30 to the supply conduit 36. A second coupling member 44 is formed adjacent the second end 34 of the distribution insert 30 adapted to facilitate coupling the distribution insert 30 to the end plate 16. A second sealing member 46 such as an O-ring, for example, can be provided to facilitate forming a substantially fluid tight seal between the second coupling member 44 and the end plate 16. It should be understood that other second coupling members such as a threaded coupling, a snap-fit coupling, a sliding radial seal, and the like, for example, can be provided to facilitate coupling the distribution insert 30 to the end plate 16. It should also be understood that the distribution insert 30 can be formed without the second coupling member 44.

An inlet chamber 48 is formed in an interior of the distribution insert 30 adjacent the first end 32 thereof. The inlet chamber 48 is in fluid communication with the inlet 38 of the distribution insert 30. A dividing wall 50 is formed in the interior of the distribution insert 30 extending longitudinally from adjacent the inlet chamber 48 to the second end 34 of the distribution insert 30. The dividing wall 50 substantially divides the interior of the distribution insert 30 into a front section 52 shown in FIG. 7 and a rear section 54 shown in FIG. 5. A plurality of wall members 56 is formed in the front section 52 and the rear section 54. The wall members 56 cooperate to form a plurality of flow channels 58, 60, 62, 64, 66, 68, 70, 72 within the interior of the distribution insert 30. Each of the flow channels 58, 60, 62, 64, 66, 68, 70, 72 provides a flow path for the fluid from the inlet chamber 48, through the interior of the distribution chamber 30 to a selected location on the exterior of the distribution insert 30. In the illustrated embodiment, eight flow channels are provided. It should be understood that additional or fewer flow channels can be provided. In the illustrated embodiment, the wall members 56 are substantially linear and abut one another at substantially right-angles. It should be understood that the wall members 56 can be curvilinear and a combination of linear and curvilinear sections to minimize the presence of right-angles between abutting wall members 56 to facilitate the flow of the fluid through the flow channels 58, 60, 62, 64, 66, 68, 70, 72.

The flow channels 58, 60, 62, 64, 66, 68, 70, 72 include flow channel inlets 58i, 60i, 62i, 64i, 66i, 68i, 70i, 72i, respectively, at one end thereof which provide fluid communication between the inlet chamber 48 and the respective flow channels 58, 60, 62, 64, 66, 68, 70, 72. At an opposite end of the respective flow channels 58, 60, 62, 64, 66, 68, 70, 72, a flow channel outlet 58o, 60o, 62o, 64o, 66o, 68o, 70o, 72o is formed in an exterior surface of the distribution insert 30. The dividing wall 50 includes apertures 58a, 60a, 62a, 64a, 66a, 68a, 70a, 72a formed therein providing fluid communication through the dividing wall 50 for the respective flow channels 58, 60, 62, 64, 66, 68, 70, 72.

In the illustrated embodiment, the flow channels 58, 60, 62, 64, 66, 68, 70, 72 are adapted to provide flow paths substantially equivalent in length from the flow channel inlets 58i, 60i, 62i, 64i, 66i, 68i, 70i, 72i, to the respective flow channel outlets 58o, 60o, 62o, 64o, 66o, 68o, 70o, 72o. Accordingly, the flow channels 58, 60, 62, 64, 66, 68, 70, 72 having outlets 58o, 60o, 62o, 64o, 66o, 68o, 70o, 72o adjacent the second end 34 of the distribution insert 30 provide a more direct path to the outlets as compared to the flow channels 58, 60, 62, 64, 66, 68, 70, 72 having outlets 58o, 60o, 62o, 64o, 66o, 68o, 70o, 72o adjacent the first end 32 of the distribution insert 30. It should be understood that flow channels having different overall lengths from the flow channel inlets 58i, 60i, 62i, 64i, 66i, 68i, 70i, 72i, to the respective flow channel outlets 58o, 60o, 62o, 64o, 66o, 68o, 70o, 72o can be used.

The flow channels 58, 60, 62, 64, 66, 68, 70, 72 have substantially equivalent total flow volume. A cross-sectional area of the flow channels 58, 60, 62, 64, 66, 68, 70, 72 changes along the length thereof to provide substantially equivalent total flow volume. Further, the changing cross-sectional area of the flow channels 58, 60, 62, 64, 66, 68, 70, 72 facilitates the arrangement of the flow channels 58, 60, 62, 64, 66, 68, 70, 72 within the distribution insert 30. The substantially equivalent total flow volume of the flow channels 58, 60, 62, 64, 66, 68, 70, 72 provides substantially equivalent fluid flow resistance through each of the flow channels 58, 60, 62, 64, 66, 68, 70, 72. Further, it should be understood that the total flow volume of the flow channels 58, 60, 62, 64, 66, 68, 70, 72 is maximized by maximizing the use of the internal volume of the distribution insert 30 which minimizes fluid pressure drop therethrough.

Ribs 74 can be formed on the interior surface of the distribution insert 30, the dividing wall 50, and the wall members 56 at selected locations within the flow channels 58, 60, 62, 64, 66, 68, 70, 72. The ribs 74 are typically formed at locations within the flow channels 58, 60, 62, 64, 66, 68, 70, 72 where the cross-sectional area is greater that the cross-sectional area in other locations. The ribs 74 provide a desired fluid pressure drop as the fluid flows through the flow channels 58, 60, 62, 64, 66, 68, 70, 72.

The distribution insert 30 may be formed as a single piece by injection molding a plastic material, for example. It should be understood that the distribution insert 30 may be formed as separate pieces which are coupled together employing an adhesive, a weld, and a snap-fit, for example. Additionally, the distribution insert 30 may be formed from a wicking material adapted to collect water entrained in the fluid flowing therethrough. It should be understood that the wicking material can be a hydrophilic material, a hydrophobic material, and any other suitable material adapted to collect water entrained in the fluid.

In the illustrated embodiment, the cross-sectional shape of the distribution insert 30 is substantially D-shaped. It should be understood that the cross-sectional shape of the distribution insert 30 can be substantially circular, oval, triangular, square, rectangular, or a combination of curved and substantially planar surfaces, for example, wherein the cross-sectional shape of the distribution insert 30 is adapted to be received within the inlet header 22 of the fuel cell assembly 10.

In use, the distribution insert 30 is inserted within the inlet header 22 to cause the second coupling member 46 to engage the end plate 16. The first coupling member 40 is caused to sealingly engage the supply conduit 36 to provide a flow of fuel from the source of the fuel through the supply conduit 36 and into the inlet 38 of the distribution insert 30. The first coupling member 40 and the second coupling member 44 facilitate securing the distribution insert 30 within the inlet header 22. The distribution insert 30 is oriented in respect of the inlet header 22 to position the flow channel outlets 58o, 60o, 62o, 64o, 66o, 68o, 70o, 72o adjacent the inlet channels 23 of the fuel cells 12. One or more spacers (not shown) can be formed on an exterior surface of the distribution insert 30 to maintain a gap between the distribution insert 30 and the entrance to the inlet channels 23 to facilitate fluid flow from the outlets 58o, 60o, 62o, 64o, 66o, 68o, 70o, 72o to the inlet channels 23 adjacent thereto.

At a start-up of an electrochemical fuel cell reaction within the fuel cell assembly 10, fuel begins to flow from the source of the fuel through the supply conduit 36 into the inlet 38 of the distribution insert 30 and is received within the inlet chamber 48. The fuel flows from the inlet chamber 48 through the flow channel inlets 58i, 60i, 62i, 64i, 66i, 68i, 70i, 72i into the respective flow channels 58, 60, 62, 64, 66, 68, 70, 72 and flows toward the respective flow channel outlets 58o, 60o, 62o, 64o, 66o, 68o, 70o, 72o. The fuel flows through the flow channel outlets 58o, 60o, 62o, 64o, 66o, 68o, 70o, 72o into the inlet header 22 adjacent the inlet channels 23 of the fuel cells 12.

The substantially equivalent flow volume of the flow channels 58, 60, 62, 64, 66, 68, 70, 72 and substantially equivalent fluid pressure drop of the fuel flowing therethrough cause a substantially simultaneous initial discharge of the fuel from the flow channel outlets 58o, 60o, 62o, 64o, 66o, 68o, 70o, 72o along the length of the inlet header 22. The substantially simultaneous initial discharge of the fuel along the length of the inlet header 22 minimizes a time difference between the introduction of the fuel to the fuel cells 12. By minimizing a time difference between the introduction of the fuel to the fuel cells 12, localized reversed current in the fuel cells 12 and an associated electrode carbon corrosion is minimized, and an undesired emission of hydrogen through the exhaust header is minimized. Further, during an ongoing electrochemical fuel cell reaction, the minimized and balanced pressure drop of the flow of fuel through the flow channels 58, 60, 62, 64, 66, 68, 70, 72 facilitates balanced flow of fuel to the fuel cells 12.

Figure 8:
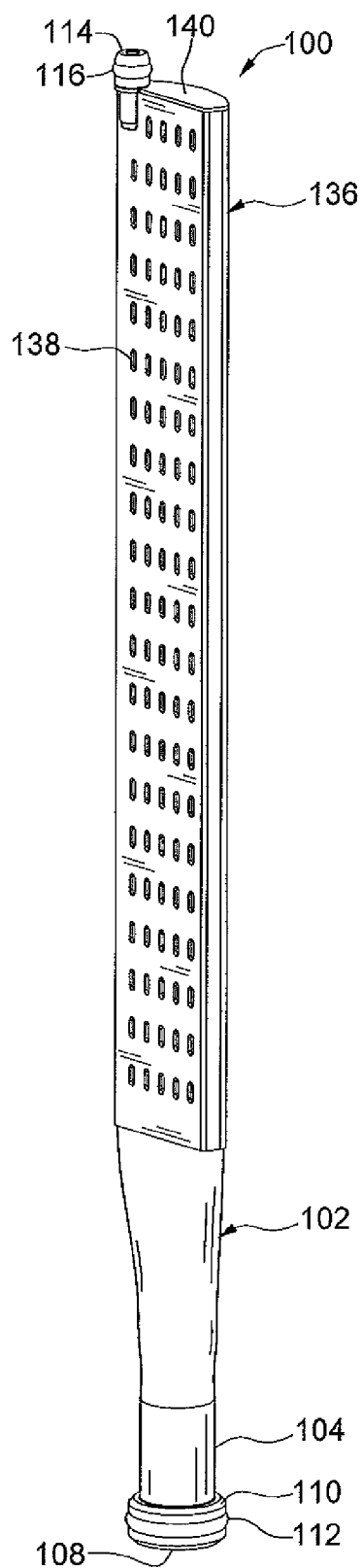
FIG. 8 is a front perspective view of a distribution insert according to another embodiment of the invention.

FIGS. 8-10 illustrate an alternate embodiment of a distribution insert 100 for the fuel cell assembly 10. In the embodiment shown, the distribution insert 100 is a generally hollow elongate insert having an inner tube 102 disposed within a sleeve 136. The inner tube 102 includes a first end 104 and a second end 106, wherein the first end 104 is disposed adjacent the inlet 26 of the end plate 14 and the second end 106 is disposed adjacent the end plate 16. The supply conduit 36 provides fluid communication from the source of the fluid to an inlet 108 at the first end 104 of the inner tube 102. The inner tube 102 is adapted to provide a fluid flow path from the supply conduit 36 through an interior of the distribution insert 100.

A first coupling member 110 is formed adjacent the first end 104 of the inner tube 102 adapted to facilitate coupling the distribution insert 100 to the supply conduit 36. A first sealing member 112 such as an O-ring, for example, can be provided to facilitate forming a substantially fluid tight seal between the first coupling member 110 and the supply conduit 36. It should be understood that other first coupling members such as a threaded coupling, a snap-fit coupling, a sliding radial seal, and the like, for example, can be provided to facilitate coupling the distribution insert 100 to the supply conduit 36. A second coupling member 114 is formed adjacent a closed end 140 of the sleeve 136 adapted to facilitate coupling the distribution insert 100 to the end plate 16. A second sealing member 116 such as an O-ring, for example, can be provided to facilitate forming a substantially fluid tight seal between the second coupling member 116 and the end plate 16. It should be understood that other second coupling members such as a threaded coupling, a snap-fit coupling, a sliding radial seal, and the like, for example, can be provided to facilitate coupling the distribution insert 100 to the end plate 16. It should also be understood that the distribution insert 100 can be formed without the second coupling member 114.

As shown in FIG. 10, an opening 118 is formed in a rear side of the inner tube 102. The opening 118 is located in the inner tube 102 to position the opening 118 at a substantial mid-point of the length of the inlet header 22. The opening 118 provides a fluid flow path from the hollow interior of the inner tube 102 through a wall forming the inner tube 102. A first portion 120 of the inner tube 102 is defined between the beginning of the inlet header 22 adjacent the end plate 14 and the opening 118. A second portion 122 of the inner tube 102 is defined between the opening 118 and the second end 106 of the inner tube 102. A first flow channel 124 is formed in an exterior surface of the first portion 120 of the inner tube 102. The first flow channel 124 is in fluid communication with the opening 118. The first flow channel 124 extends from the opening 118 substantially parallel to the longitudinal axis of the inner tube 102 toward the first end 104 thereof and terminates at a distal end 126. A second flow channel 128 is formed in the exterior surface of the second portion 122 of the inner tube 102. The second flow channel 128 is in fluid communication with the opening 118. The second flow channel 128 extends from the opening 118 substantially parallel to the longitudinal axis of the inner tube 102 toward the second end 106 thereof and terminates at a distal end 130.

A plurality of first distribution flow channels 132 is formed in the exterior surface of the first portion 120 of the inner tube 102. The first distribution flow channels 132 are in fluid communication with the first flow channel 124. The first distribution flow channels 132 extend in a generally fan-like pattern from the first flow channel 124 around the periphery of the inner tube 102 and terminate at a front side of the inner tube 102, as shown in FIG. 9. A plurality of second distribution flow channels 134 is formed in the exterior surface of the second portion 122 of the inner tube 102. The second distribution flow channels 134 are in fluid communication with the second flow channel 128. The second distribution flow channels 134 extend in a general fan-like pattern from the second flow channel 128 around the periphery of the inner tube 102 and terminate at the front side of the inner tube 102. It should be understood that the distribution flow channels 132, 134 can be formed to extend from the flow channels 124, 128 in other patterns. The distribution flow channels 132, 134 provide a fluid flow path from the first flow channel 124 and the second flow channel 128, respectively, around at least a portion of the periphery of the inner tube 102, wherein the terminal end portions of the distribution flow channels 132, 134 are substantially perpendicular to the longitudinal axis of the inner tube 102 and evenly spaced apart along the length thereof. The flow channels 124, 128 and the distribution flow channels 132, 134 are adapted to provide flow paths substantially equivalent in total flow volume from the opening 118 to the terminal end portions of the distribution flow channels 132, 134. A cross-sectional area of the flow channels 124, 128 and the distribution flow channels 132, 134 can change along the length thereof to provide substantially equivalent total flow volume. The substantially equivalent total flow volume of the flow channels 124, 128 and the distribution flow channels 132, 134 provides substantially equivalent fluid flow resistance through each of the flow channels 124, 128 and the distribution flow channels 132, 134.

In the embodiment shown, the distribution flow channels 132, 134 extend from one side of the respective flow channels 124, 128. It should be understood that the distribution flow channels 132, 134 can be formed to extend from both sides of the flow channels 124, 128 and extend in opposing directions therefrom around the periphery of the inner tube 102, wherein all the distribution flow channels terminate on the front side of the inner tube 102. It should also be understood that the respective cross-sectional areas of the distribution flow channels 132, 134 can be varied to provide substantially equivalent total flow volume and fluid flow resistance therethrough.

The inner tube 102 of the distribution insert 100 may be formed as a single piece by injection molding a plastic material, for example. It should be understood that the inner tube 102 can be formed employing other processes and materials. It should also be understood that the inner tube 102 may be formed as separate pieces which are coupled together to form the inner tube 102. Additionally, the inner tube 102 may be formed from a wicking material adapted to collect water entrained in the fluid. It should be understood that the wicking material can be a hydrophilic material, a hydrophobic material, and any other suitable material adapted to collect water entrained in the fluid.

The sleeve 136 is received over the inner tube 102 and surrounds at least a portion of the inner tube 102. An inner surface of the outer sleeve 136 abuts the exterior surface of the inner tube 102 and forms a substantially fluid tight seal therebetween to minimize a flow of the fluid between the inner surface of the outer sleeve 136 and the exterior surface of the inner tube 102. It should be understood that a sealing member (not shown) such as an O-ring, a gasket material, and an adhesive, for example, can be disposed between the inner surface of the sleeve 136 and the exterior surface of the inner tube 102 to facilitate forming the substantially fluid tight seal. The sleeve 136 covers the opening 118, the flow channels 124, 128, and the distribution flow channels 132, 134 formed in the inner tube 102 and causes the fluid to flow along the length of the flow channels 124, 128 and the distribution flow channels 132, 134.

A front side of the sleeve 136 includes a plurality of outlets 138 formed in a wall forming the sleeve 136. The sleeve 136 is oriented in respect of the inner tube 102 to position the outlets 138 substantial on top of the terminal end portions of the distribution flow channels 132, 134. The outlets 138 are adapted to provide fluid communication from the terminal end portions of the distribution flow channels 132, 134 through the sleeve 136 into the inlet header 22. Further, the distribution insert 100 is oriented in respect of the inlet header 22 to position the outlets 138 of the sleeve 136 adjacent the inlet channels 23 of the fuel cells 12. It should be understood that the sleeve 136 can be eliminated from the distribution insert 100, wherein an inner surface of the inlet header 22 abuts the exterior surface of the inner tube 102 to facilitate directing the flow of the fluid through the flow channels 124, 128 and the distribution flow channels 132, 134 of the inner tube 102. One or more spacers (not shown) can be formed on an exterior surface of the sleeve 136 or the inner tube 102 to maintain a gap between the distribution insert 100 and the entrance to the inlet channels 23 to facilitate fluid flow from the distribution flow channels 132, 134 and the outlets 138 to the inlet channels 23 adjacent thereto.

The sleeve 136 of the distribution insert 100 may be formed by injection molding a plastic material, for example, as a single piece or as two or more pieces, wherein the pieces are coupled together employing an adhesive, a weld, and a snap fit, for example. It should be understood that the sleeve 136 can be formed employing other processes and materials. Additionally, the sleeve 136 may be formed from a wicking material adapted to collect water entrained in the fluid. It should be understood that the wicking material can be a hydrophilic material, a hydrophobic material, and any other suitable material adapted to collect water entrained in the fluid.

It should be understood that the cross-sectional shape of the distribution insert 100 can be substantially circular, oval, triangular, square, rectangular, or a combination of curved and substantially planar surfaces, for example, wherein the cross-sectional shape of the distribution insert 100 is adapted to be received within the inlet header 22 of the fuel cell assembly 10.

In use, the distribution insert 100 is inserted within the inlet header 22 to cause the second coupling member 114 to engage the end plate 16. The first coupling member 110 is caused to sealingly engage the supply conduit 36 to provide a flow of fuel from the source of the fuel through the supply conduit 36 and into the inlet 108 of the distribution insert 100. The first coupling member 110 and the second coupling member 114 facilitate securing the distribution insert 100 within the inlet header 22. The distribution insert 100 is oriented in respect of the inlet header 22 to position the outlets 138 of the sleeve 136 adjacent the inlet channels 23 of the fuel cells 12.

At a start-up of an electrochemical fuel cell reaction within the fuel cell assembly 10, fuel begins to flow from the source of the fuel through the supply conduit 36 into the inlet 108 of the distribution insert 100. The fuel flows from the inlet 108 through the interior of the inner tube 102 to the opening 118 formed therein and is received by the flow channels 124, 128. The fuel flows through the flow channels 124, 128 toward the distal ends 126, 130 thereof and is received by the distribution flow channels 132, 134, respectively. The fuel flows through the distribution flow channels 132, 134 around the periphery of the inner tube 102 toward the front side of the distribution insert 100 through the outlets 138 of the sleeve 136 and into the inlet header 22 adjacent the inlet channels 23 of the fuel cells 12.

The substantially equivalent total flow volume of the flow paths from the outlet 118 through the flow channels 124, 128 and the distribution flow channels 132, 134 of the inner tube 102 to the outlets 138 of the sleeve 136 provides a substantially simultaneous initial discharge of the fuel in to the inlet header 22 along the length thereof. The substantially simultaneous initial discharge of the fuel along the length of the inlet header 22 minimizes a time difference between the introduction of the fuel to the fuel cells 12. By minimizing a time difference between the introduction of the fuel to the fuel cells 12, localized reversed current in the fuel cells 12 and an associated electrode carbon corrosion is minimized, and an undesired emission of hydrogen through the exhaust header is minimized.

Figure 11:
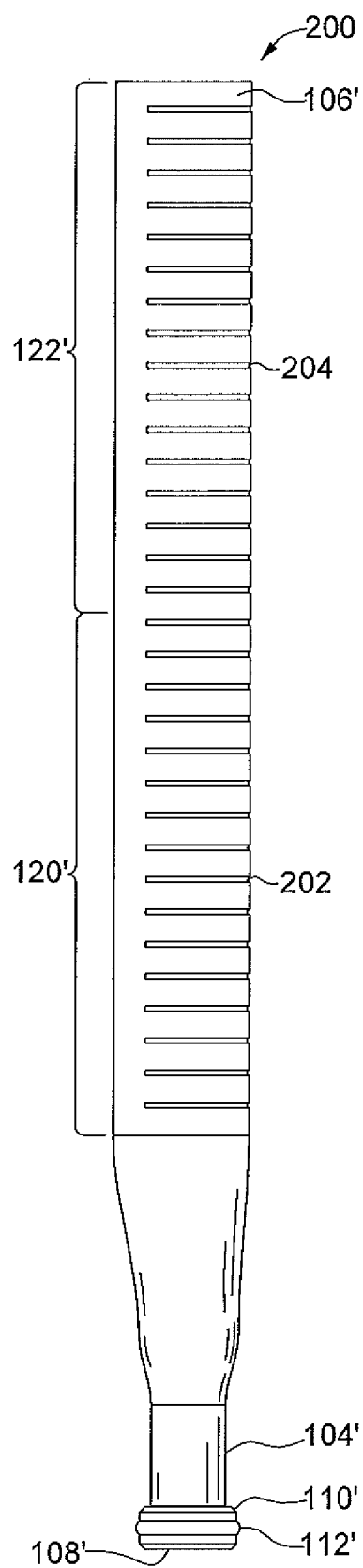
FIG. 11 is a front elevational view of an inner tube for the distribution insert illustrated in FIG. 8 according to another embodiment of the invention.
Figure 12:
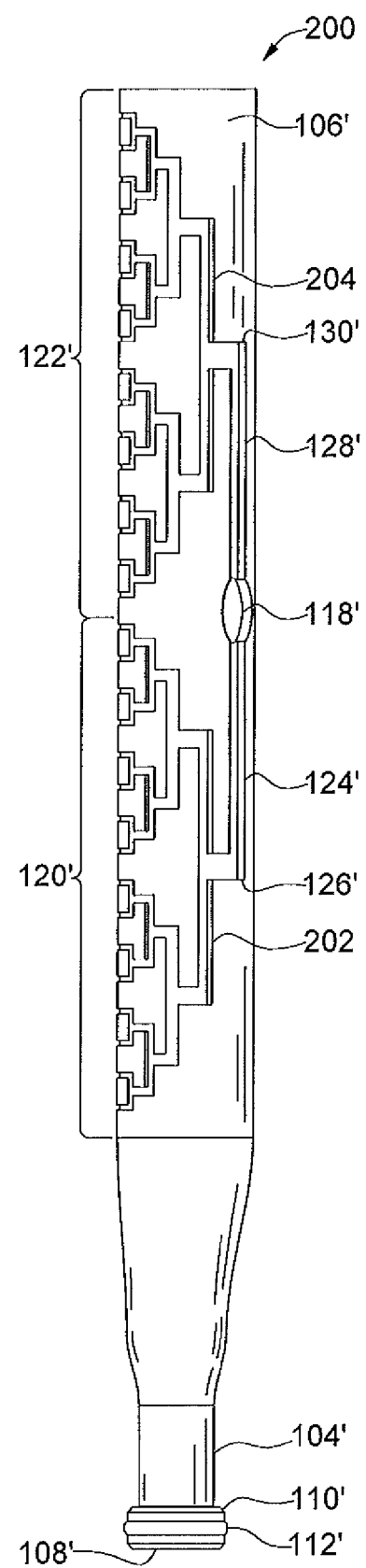
FIG. 12 is a rear elevational view of the inner tube illustrated in FIG. 11.

FIGS. 11-12 show an inner tube 200 for the distribution insert 100 of FIG. 8 according to another embodiment of the present invention similar to the inner tube 102 of FIGS. 9-10, except as described below. Like structure repeated from the description of FIGS. 8-10 includes the same reference numeral with a prime (') symbol. As shown, a pair of distribution flow channels 202, 204 is formed in an exterior surface of the inner tube 200, wherein the distribution flow channels 202, 204 are in fluid communication with the flow channels 124' and 128', respectively. The distribution flow channels 202, 204 extend around the periphery of the inner tube 200 and terminate at a front side of the inner tube 200 adjacent the outlets 138 of the sleeve 136. The distribution flow channels 202, 204 are branched flow channels, wherein the distribution flow channels 202, 204 are bifurcated at four points along the length thereof to provide a total of thirty-two (32) individual channels at the front side of the inner tube 200, as shown in FIG. 11. It should be understood that the distribution flow channels 202, 204 can be bifurcated to provide fewer or additional individual channels at the front side of the inner tube 200. The distribution flow channels 202, 204 are adapted to provide flow paths substantially equivalent in total flow volume from the opening 118' to the terminal end portions of the distribution flow channels 202, 204. It should also be understood that the respective cross-sectional areas of the distribution flow channels 202, 204 can be varied to provide substantially equivalent total flow volume and fluid flow resistance therethrough.

In the illustrated embodiment, the distribution flow channels 202, 204 are adapted to provide flow paths substantially equivalent in length from the outlet 118' to the terminal ends of the distribution flow channels 202, 204. It should be understood that distribution flow channels having different overall lengths from the outlet 118' to the terminal ends of the distribution flow channels 202, 204 can be used. The remaining structure and use of the inner tube 200 is substantially the same as structure and use of the inner tube 102 described herein above.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A fluid distribution insert for a fuel cell assembly comprising:
   a hollow insert with a first end and a second end, the hollow insert received within an inlet header of the fuel cell assembly, the fuel cell assembly including a plurality of fuel cells, each of the fuel cells having an inlet port, the inlet header defined by an alignment of the inlet ports of each of the fuel cells, at least a major portion of the hollow insert disposed inside of the inlet header, the first end of the hollow insert disposed adjacent a first end of the fuel cell assembly, and the second end of the hollow insert disposed adjacent a second end of the fuel cell assembly;
   an inlet formed at the first end of the hollow insert adapted to receive a fluid therein;
   a plurality of outlets formed intermediate the first end of the hollow insert and the second end of the hollow insert; and a plurality of flow channels formed in the hollow insert providing fluid communication between the inlet and the outlets to deliver the fluid to a plurality of fuel cells of the fuel cell assembly, wherein the flow channels provide for a substantially simultaneous delivery of the fluid to the fuel cells during a start-up procedure of the fuel cell assembly;

wherein at least one wall section extends inwardly from an inner surface of the hollow insert, the at least one wall section forming a boundary between at least two of the flow channels formed in the hollow insert.

2. The fluid distribution insert according to claim 1, wherein a total flow volume of each of the flow channels is substantially equivalent.

3. The fluid distribution insert according to claim 2, wherein a rib is formed on at least one of the wall sections to vary the cross-sectional area of the flow channels along the length thereof.

4. The fluid distribution insert according to claim 1, wherein the flow channels are formed in an exterior surface of the hollow insert and an opening is formed in the hollow insert providing fluid communication between the inlet and the flow channels, a terminal end portion of the flow channels forming the outlets of the hollow insert.

5. The fluid distribution insert according to claim 4, wherein the exterior surface of the hollow insert abuts an interior surface forming the inlet header, wherein the flow channels and the interior surface of the inlet header cooperate to direct the fluid to the terminal end portions of the flow channels adjacent the fuel cells of the fuel cell assembly.

6. The fluid distribution insert according to claim 1, the hollow insert further comprising:

a sleeve having the outlets formed in a wall forming the sleeve; and an inner tube disposed within the sleeve, the inner tube including the inlet and the flow channels formed in an exterior surface thereof, an opening formed in the inner tube providing fluid communication between the inlet and the flow channels, wherein an inner surface of the sleeve and the flow channels cooperate to direct the fluid through the flow channels to the outlets formed in the sleeve.

7. The fluid distribution insert according to claim 1, including one of a first coupling member formed adjacent the first end of the hollow insert to couple the inlet of the hollow insert to a fluid supply conduit and a second coupling member formed adjacent the second end of the hollow insert to facilitate coupling the hollow insert to the fuel cell assembly.

8. The fluid distribution insert according to claim 1, wherein the hollow insert is formed from a wicking material.

9. A fluid distribution insert for a fuel cell assembly comprising:

a hollow insert with a first end and a second end, the hollow insert received within an inlet header of the fuel cell assembly, the fuel cell assembly including a plurality of fuel cells, each of the fuel cells having an inlet port, the inlet header defined by an alignment of the inlet ports of each of the fuel cells, at least a major portion of the hollow insert disposed inside of the inlet header, the first end of the hollow insert disposed adjacent a first end of the fuel cell assembly, and the second end of the hollow insert disposed adjacent a second end of the fuel cell assembly;

an inlet formed at the first end of the hollow insert adapted to receive a fluid therein;

a first coupling member formed adjacent the first end of the hollow insert to couple the inlet of the hollow insert to a fluid supply conduit;

a second coupling member formed adjacent the second end of the hollow insert to facilitate coupling the hollow insert to the fuel cell assembly;

a plurality of outlets formed intermediate the first end of the hollow insert and the second end of the hollow insert; and a plurality of flow channels formed in the hollow insert providing fluid communication between the inlet and the outlets to deliver the fluid to a plurality of fuel cells of the fuel cell assembly, wherein the flow channels provide for a substantially simultaneous delivery of the fluid to the fuel cells during a start-up procedure of the fuel cell assembly;

wherein at least one wall section extends inwardly from an inner surface of the hollow insert, the at least one wall section forming a boundary between at least two of the flow channels formed in the hollow insert.

10. The fluid distribution insert according to claim 9, wherein a total flow volume of each of the flow channels is substantially equivalent.

11. The fluid distribution insert according to claim 9, wherein the flow channels are formed in an exterior surface of the hollow insert and an opening is formed in the hollow insert providing fluid communication between the inlet and the flow channels, a terminal end portion of the flow channels forming the outlets of the hollow insert, the exterior surface of the hollow insert abuts an interior surface forming the inlet header, wherein the flow channels and the interior surface of the inlet header cooperate to direct the fluid to the terminal end portions of the flow channels adjacent the fuel cells of the fuel cell assembly.

12. The fluid distribution insert according to claim 9, the hollow insert further comprising:

a sleeve having the outlets formed in a wall forming the sleeve; and an inner tube disposed within the sleeve, the inner tube including the inlet and the flow channels formed in an exterior surface thereof, an opening formed in the inner tube providing fluid communication between the inlet and the flow channels, wherein an inner surface of the sleeve and the flow channels cooperate to direct the fluid through the flow channels to the outlets formed in the sleeve.

13. A fuel cell assembly comprising:

a first end plate and a spaced apart second end plate;

a plurality of fuel cells disposed between the first end plate and the second end plate;

an inlet header in fluid communication with the fuel cells for supplying a reactant gas to the fuel cells;

a hollow insert with a first end and a second end, the hollow insert received within an inlet header of the fuel cell assembly, each of the fuel cells having an inlet port, the inlet header defined by an alignment of the inlet ports of each of the fuel cells, at least a major portion of the hollow insert disposed inside of the inlet header, the first end of the hollow insert disposed adjacent a first end of the fuel cell assembly, and the second end of the hollow insert disposed adjacent a second end of the fuel cell assembly;

an inlet formed at the first end of the hollow insert adapted to receive the reactant gas therein;

a plurality of outlets formed intermediate the first end of the hollow insert and the second end of the hollow insert; and a plurality of flow channels formed in the hollow insert providing fluid communication between the inlet and the outlets to deliver the reactant gas to the plurality of fuel cells of the fuel cell assembly, wherein the flow channels provide for a substantially simultaneous delivery of the fluid to the fuel cells during a start-up procedure of the fuel cell assembly;

wherein at least one wall section extends inwardly from an inner surface of the hollow insert, the at least one wall section forming a boundary between at least two of the flow channels formed in the hollow insert.

14. The fuel cell assembly according to claim 13, wherein a total flow volume of each of the flow channels is substantially equivalent.

15. The fuel cell assembly according to claim 13, wherein the flow channels are formed in an exterior surface of the hollow insert and an opening is formed in the hollow insert providing fluid communication between the inlet and the flow channels, a terminal end portion of the flow channels forming the outlets of the hollow insert.

16. The fuel cell assembly according to claim 15, wherein the exterior surface of the hollow insert abuts an interior surface forming the inlet header, wherein the flow channels and the interior surface of the inlet header cooperate to direct the reactant gas to the terminal end portions of the flow channels adjacent the fuel cells of the fuel cell assembly.

17. The fuel cell assembly according to claim 13, the hollow insert further comprising:

a sleeve having the outlets formed in a wall forming the sleeve; and an inner tube disposed within the sleeve, the inner tube including the inlet and the flow channels formed in an exterior surface thereof, an opening formed in the inner tube providing fluid communication between the inlet and the flow channels, wherein an inner surface of the sleeve and the flow channels cooperate to direct the reactant gas through the flow channels to the outlets formed in the sleeve.

* * * * *